(12) United States Patent
Hu

(10) Patent No.: US 9,739,982 B2
(45) Date of Patent: Aug. 22, 2017

(54) ZOOM LENS

(71) Applicant: BOLYMEDIA HOLDINGS CO. LTD., Santa Clara, CA (US)

(72) Inventor: Xiaoping Hu, Shenzhen (CN)

(73) Assignee: Bolymedia Holdings Co. Ltd., Santa Clara, CA (US)

( * ) Notice: Subject to any disclaimer, the term of this patent is extended or adjusted under 35 U.S.C. 154(b) by 0 days.

(21) Appl. No.: 15/312,611

(22) PCT Filed: May 30, 2014

(86) PCT No.: PCT/CN2014/078898
§ 371 (c)(1),
(2) Date: Nov. 18, 2016

(87) PCT Pub. No.: WO2015/180121
PCT Pub. Date: Dec. 3, 2015

(65) Prior Publication Data
US 2017/0097492 A1    Apr. 6, 2017

(51) Int. Cl.
*G02B 7/04* (2006.01)
*G02B 13/00* (2006.01)
(Continued)

(52) U.S. Cl.
CPC .......... *G02B 13/009* (2013.01); *G02B 7/102* (2013.01); *H02K 41/0356* (2013.01); *H02N 2/02* (2013.01)

(58) Field of Classification Search
CPC ... G02B 7/04; G02B 7/09; G02B 7/10; G02B 7/105; H02K 41/0356; H02K 33/18
See application file for complete search history.

(56) References Cited

U.S. PATENT DOCUMENTS

2007/0166022 A1*  7/2007  Lai ........................... G02B 7/08
                                                        396/133
2008/0024016 A1    1/2008  Liu et al.
(Continued)

FOREIGN PATENT DOCUMENTS

CN    2189796 Y    2/1995
CN    1321354 A   11/2001
(Continued)

OTHER PUBLICATIONS

U.S. Appl. No. 15/302,479, filed Oct. 6, 2016, Xiaoping Hu.
(Continued)

*Primary Examiner* — Joseph P Martinez
(74) *Attorney, Agent, or Firm* — Ladas & Parry, LLP

(57) ABSTRACT

A zoom lens comprises a focus driving mechanism and a zoom driving mechanism and corresponding lens groups. The zoom driving mechanism is sleeved outside the focus driving mechanism. The focus driving mechanism is a voice coil motor and comprises a focus stator assembly (7a1) and a focus rotor assembly (7a2) that are connected by means of an elastic connection member (7a3). One of a focus stator sleeve (7a11) in the focus stator assembly and a focus rotor sleeve (7a21) in the focus rotor assembly is a permanent magnet sleeve, and the other of the focus stator sleeve (7a11) and the focus rotor sleeve (7a21) is a non-magnet sleeve, and the assembly to which the non-magnet sleeve belongs further comprises a preliminary magnetic member (7a22) and a driving coil (7a23). Due to the magnetic force pre-existing between the preliminary magnetic member and the permanent magnet sleeve, the elastic connection member is in a force balanced state without electrification, so that a smaller electromagnetic force is required for driving the elastic connection member, and accordingly the driving current and power consumption are reduced. Moreover, because the zoom driving mechanism is sleeved outside the (Continued)

focus driving mechanism, a large aperture can be easily realized, and installation and implementation are easier.

11 Claims, 7 Drawing Sheets

(51) Int. Cl.
*G02B 7/10* (2006.01)
*H02K 41/035* (2006.01)
*H02N 2/02* (2006.01)

(56) References Cited

U.S. PATENT DOCUMENTS

| | | |
|---|---|---|
| 2008/0231975 A1 | 9/2008 | Hou et al. |
| 2008/0310037 A1 | 12/2008 | Kuo et al. |
| 2011/0235195 A1 | 9/2011 | Ke |

FOREIGN PATENT DOCUMENTS

| | | |
|---|---|---|
| CN | 1736013 A | 2/2006 |
| CN | 1873455 A | 12/2006 |
| CN | 1959453 A | 5/2007 |
| CN | 1992483 A | 7/2007 |
| CN | 201063067 Y | 5/2008 |
| CN | 101425762 A | 5/2009 |
| CN | 101738702 A | 6/2010 |
| CN | 101951467 A | 1/2011 |
| CN | 102043225 A | 5/2011 |
| CN | 102088235 A | 6/2011 |
| CN | 102590979 A | 7/2012 |
| CN | 102820759 A | 12/2012 |
| CN | 103066782 A | 4/2013 |
| CN | 103529534 A | 1/2014 |
| CN | 103777305 A | 5/2014 |
| CN | 104716766 A | 6/2015 |
| CN | 104753303 | 7/2015 |
| JP | 03-38609 | 2/1991 |
| JP | 11-146258 | 5/1999 |
| JP | 2000352656 A | 12/2000 |
| JP | 2006017923 A | 1/2006 |
| JP | 2009100595 A | 5/2009 |
| TW | 325524 U | 1/2008 |
| WO | 2007118418 | 10/2007 |
| WO | 2015/157909 A1 | 10/2015 |

OTHER PUBLICATIONS

International Search Report for PCT/CN2014/078898 dated Feb. 27, 2015 and its English translation provided by WIPO.
International Search Report for PCT/CN2014/075377 dated Jan. 23, 2015 and its English translation provided by WIPO.
Written Opinion of the International Searching Authority for PCT/CN2014/075377 dated Jan. 23, 2015 (English translation provided by WIPO).
International Preliminary Report on Patentability Ch I for PCT/CN2014/075377 dated Oct. 18, 2016 (English translation provided by WIPO).
From CN201310748592.0 (now published as CN104753303), First Office Action dated Sep. 19, 2016, and its English translation from Bing Translator.
From CN201310677074.4 (now published as CN104716766), First Office Action dated Aug. 26, 2016, and its English translation from Bing Translator.
From CN1873455A, Search Report, and its English translation from Bing Translator.
From CN102590979 A, First Office Action dated Apr. 17, 2013, and its English translation from Bing Translator.

* cited by examiner

ZOOM LENS

CROSS-REFERENCE TO RELATED APPLICATION

This application is the U.S. National Stage of International Patent Application No. PCT/CN2014/078898 filed on May 30, 2014, the disclosure of which is hereby incorporated by reference in its entirety.

TECHNICAL FIELD

The present disclosure relates to the field of lens, in particular to a compact and miniature zoom lens which is suitable for use as a cell phone lens.

BACKGROUND

With the promotion and popularization of digital imaging technologies, optical imaging devices are widely used in various types of equipments, such as a variety of portable and small equipments. Miniaturized optical imaging devices, such as small zoom lenses, are widely needed.

The existing small zoom lens generally includes a focus driving mechanism and a zoom driving mechanism which are used to drive corresponding lens groups to move to achieve focus and zoom, respectively.

Voice coil motor (VCM) is a relatively simple motor. Specifically, a linear voice coil motor is widely used in the optical field, such as in an auto focus module of a camera of a cell phone. For clarity, the moving part of the voice coil motor is referred to as focus mover assembly and the relatively fixed part is referred to as focus stator assembly hereinafter.

A basic structure of a voice coil motor is shown in FIG. 1, which generally includes a stator $1a1$, a mover $1a2$ and an elastic connection member $1a3$. The elastic connection member connects the mover and the stator. A load (not shown) is fixedly mounted at the mover. In FIG. 1, the stator is a permanent magnet, and the focus mover assembly includes a driving coil $1a23$ wound on the mover. After the driving coil is supplied with power, the mover is linearly moved under the action of the magnetic field of the stator. A movement of the mover in an opposite direction may be achieved by supplying a reverse current to the driving coil or utilizing the restoring force of the spring. In other examples, it is also possible that the mover is a permanent magnet and the driving coil is included in the focus stator assembly.

The voice coil motor with the structure described above may precisely position the location of the load (for example, move a focus lens to a desired position) by the balance between the electromagnetic force generated by the driving coil and the elastic force of the elastic connection member. In general, the elastic force of the elastic connection member is proportional to the displacement thereof in a working range, which leads to that the larger the displacement of the mover, the larger the electromagnetic force required, and the larger the current required for driving the driving coil. In a case that the mover needs to be kept at a fixed position (for example, a position for focusing) for a long time, the current required for driving the driving coil also needs to be maintained for a long time, which leads to a larger static holding power consumption of the voice coil motor.

SUMMARY

The present disclosure may provide a zoom lens which may include a substrate, a focus driving mechanism, a first focus lens group, a zoom driving mechanism and a first zoom lens group. The focus driving mechanism may drive the first focus lens group to move axially. The zoom driving mechanism may drive the first zoom lens group to move axially. Both the focus driving mechanism and the zoom driving mechanism may be sleeve structure arranged coaxially. The zoom driving mechanism may be sleeved at outside of the focus driving mechanism. The focus driving mechanism may be a voice coil motor and include a focus stator assembly, a focus mover assembly and an elastic connection member. The focus stator assembly may be fixed with respect to the substrate, and the focus mover assembly may be connected with the focus stator assembly through the elastic connection member. The focus stator assembly may include a focus stator sleeve, and the focus mover assembly may include a focus mover sleeve which is sleeved with the focus stator sleeve. One of the focus stator sleeve and the focus mover sleeve may be a permanent magnet sleeve, and the other may be a non-magnet sleeve. The assembly to which the non-magnet sleeve belongs may further include a preliminary magnetic member and a driving coil. The preliminary magnetic member may be made of permanent or magnetism reception materials and fixed with respect to the non-magnet sleeve. The driving coil may be fixed with respect to the non-magnet sleeve. When the driving coil is not supplied with power, a magnetic force previously existing between the preliminary magnetic member and the permanent magnet sleeve is balanced with an elastic force of the elastic connection member.

In the zoom lens according to the present disclosure, the focus driving mechanism makes the elastic connection member to be in a force balanced state in the case of no electricity through the pre-existing magnetic force. Furthermore, the pre-existing magnetic force leads to that only a smaller electromagnetic force is required for driving the elastic connection member to move, and accordingly the driving current and power consumption are reduced. Moreover, because the zoom driving mechanism is sleeved outside the focus driving mechanism, a large aperture can be easily realized, and installation and implementation are easier.

The specific example of the present disclosure will be described in details with reference to the drawings.

DETAILED DESCRIPTION

The zoom lens according to the present disclosure may include a focus driving mechanism used to drive a first focus lens group to move axially and a zoom driving mechanism used to drive a first zoom lens group to move axially. Both the focus driving mechanism and the zoom driving mechanism may be sleeve structures arranged coaxially. The zoom driving mechanism may be sleeved at outside of the focus driving mechanism. In the present disclosure, the moving part in the driving mechanism (motor) may be referred to as mover assembly, and the relatively fixed part in the driving mechanism may be referred to as stator assembly. The stator assembly may generally be fixed with respect to a substrate. The examples of the focus driving mechanism and the zoom driving mechanism will be described hereinafter, respectively.

1. Focus Driving Mechanism

The zoom lens according to the present disclosure may use an excellent voice coil motor as the focus driving mechanism, which may be also referred to as "super voice coil motor" and may adopt the principles and structure described in the PCT application with an international application number of PCT/CN2014/075377 and a title of "VOICE COIL MOTOR AND FOCUSING LENS".

Figure 1:
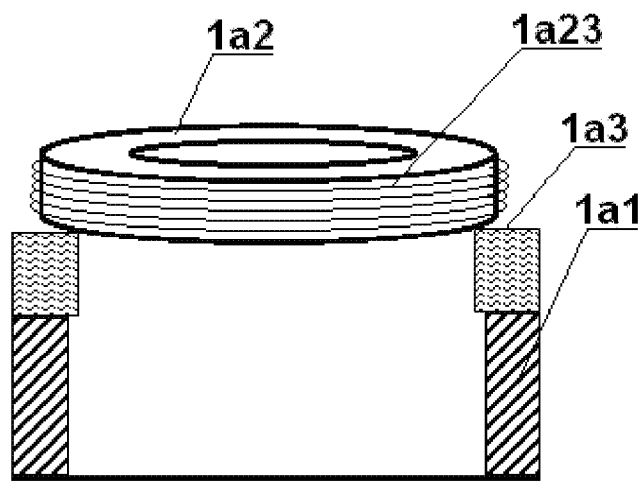
FIG. 1 schematically shows an existing voice coil motor.
Figure 2:
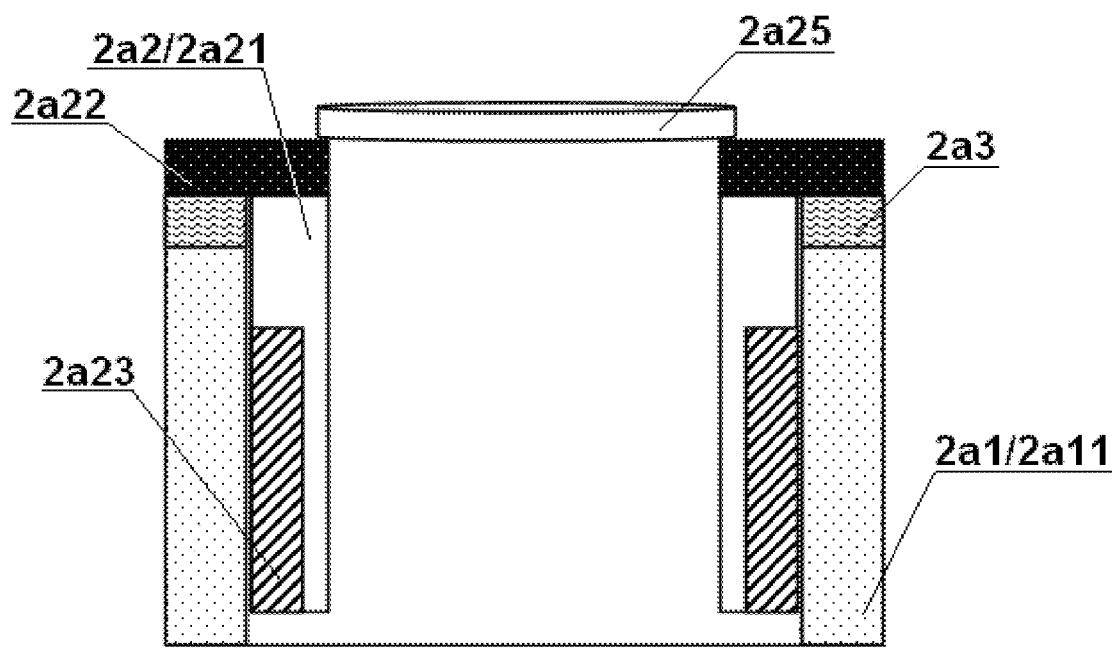
FIG. 2 schematically shows an equivalent structure of the voice coil motor used in the present disclosure.

An equivalent structure of the super voice coil motor according to the present disclosure may be shown in FIG. 2, which may include a focus stator assembly $2a1$, a focus mover assembly $2a2$ and an elastic connection member $2a3$. The focus mover assembly may be connected with the focus stator assembly through the elastic connection member. The focus stator assembly may be relatively fixed, and may include a focus stator sleeve $2a11$. The focus stator sleeve may be fixed on a substrate (not shown). The focus mover assembly may include a focus mover sleeve $2a21$ which may be coaxially sleeved on the focus stator sleeve. In order to better maintain the stability of the optical axis during the axial movement, the focus stator sleeve may preferably be closely sleeved with the focus mover sleeve, and the contact surface may be a smooth surface. In the specific implementation, the focus stator sleeve may be sleeved at outside, or inside, of the focus mover sleeve, which may be determined based on design needs. Without loss of generality, the elastic connection member may be helical spring or other forms, such as plane spring leaf formed by metal etching process, etc.

One of the focus stator sleeve and the focus mover sleeve may be a permanent magnet sleeve, and the other may be a non-magnet sleeve. The assembly to which the non-magnet sleeve belongs may further include a preliminary magnetic member and a driving coil. For example, in FIG. 2, the focus stator sleeve may be a permanent magnet sleeve and the focus mover sleeve may be a non-magnet sleeve, and thus the focus mover assembly may further include a preliminary magnetic member $2a22$ and a driving coil $2a23$. Of course, the focus stator sleeve being a non-magnet sleeve and the focus mover sleeve being a permanent magnet sleeve may also be possible. In this case, the focus stator assembly may further include a preliminary magnetic member and a driving coil.

The preliminary magnetic member may be made of permanent magnetic materials or magnetism reception materials, and may be fixed with respect to the non-magnet sleeve. For example, in a case that the focus mover sleeve is a non-magnet sleeve, the preliminary magnetic member may be a magnetic ring which is disposed coaxially and fixed at one end of the focus mover sleeve, as shown in FIG. 2. As another example, in a case that the focus stator sleeve is a non-magnet sleeve, the preliminary magnetic member may be fixed on the focus stator sleeve, on other part of the focus stator assembly, or on the substrate. In some embodiments, the preliminary magnetic member may also be disposed in discrete form. For example, the preliminary magnetic members may be embedded in or fixed on the non-magnet sleeve with intervals, as long as they can generate pre-existing magnetic forces with the permanent magnet sleeve.

The driving coil may be fixed with respect to the non-magnet sleeve, such as be disposed on the inner or outer surface of the non-magnet sleeve. For example, in FIG. 2, the driving coil is disposed on the out wall of the focus mover sleeve and abuts the inner wall of the focus stator sleeve.

A first focus lens group to be driven may generally be fixed on the focus mover assembly. For example, with reference to FIG. 2, the first focus lens group $2a25$ may be fixed on the magnetic ring. In other embodiments, the lens group may also be mounted on a lens support member, which in turn may be connected to the focus mover assembly.

When the driving coil is not supplied with power, the magnetic force preliminarily existing between the preliminary magnetic member and the permanent magnet sleeve may cause the elastic connection member connecting the focus mover assembly and the focus stator assembly to deform and achieve a balance with the elastic force generated thereby, such that the elastic connection member is previously in a force equilibrium state. Therefore, the position where the elastic connection member is previously kept balance may be set on one of or between the two endpoints of its work range so as to achieve the zero power consumption in corresponding working state. Furthermore, the power consumption required for deflecting the elastic connection member from the force equilibrium position is smaller than that in the case that the "pre-existing magnetic force" is not applied, such that, when used for optical focusing, it has the advantages of low power consumption and large travel. The detailed theoretical analysis relating to the reduction of the drive power consumption of the elastic connection member by the pre-existing magnetic force may be described in a Chinese patent application with an application number of CN201310748592.0.

When the driving coil is supplied with power, a force will be generated between the coil and the permanent magnet sleeve and the preliminary magnetic member. The balance between the "pre-existing magnetic force" and the elastic force will be changed accordingly, and thereby the focus mover assembly will be driven to move axially. The force between the permanent magnet sleeve and the driving coil will be conceptually described below.

The permanent magnet sleeve may be magnetized in two directions. One is radial magnetization, in which the inner or outer surface of the sleeve is the south or north pole. The other is axial magnetization, in which the upper or lower end of the sleeve is the south or north pole.

In the case that the magnetization of the permanent magnet sleeve is the radial magnetization, when the driving coil is supplied with power, an axial electromagnetic force (a Lorentz force) will be generated between the coil and the permanent magnet sleeve, and thereby the focus mover assembly will be driven to move up and down.

In the case that the magnetization of the permanent magnet sleeve is the axial magnetization, when the driving coil is supplied with power, the magnetic field force between the coil and the permanent magnet sleeve will be in the radial direction, but will cancel each other out due to the symmetry of the circumference. However, the magnetic field generated by the coil will be the same with or opposite to the magnetic field of the permanent magnet sleeve in direction. Therefore, the magnetic field generated by the current will be added to or canceled out from the magnetic field of the permanent magnet sleeve, and thereby the force between the permanent magnet sleeve and the preliminary magnetic member will be increased or reduced, and the movement of the focus mover assembly will be achieved by destroying the balance between the "pre-existing magnetic force" and the elastic force.

Preferably, the elastic connection member may be made of magnetism reception materials, such as steel or ferromagnetic materials. The elastic connection member can achieve the effect of transferring the magnetic force between the permanent magnet sleeve and the preliminary magnetic member and facilitate the reduction of the weight of the focus mover assembly.

2. Zoom Driving Mechanism

The zoom lens according to the present disclosure may adopt various suitable motors as the zoom driving mechanism, such as polyhedral ultrasonic motor or disc electromagnetic motor. The zoom driving mechanism may generally include a zoom stator assembly and a zoom mover assembly. The zoom stator assembly may be fixed with respect to a substrate. The zoom mover assembly may drive a first zoom lens group.

Figure 3:
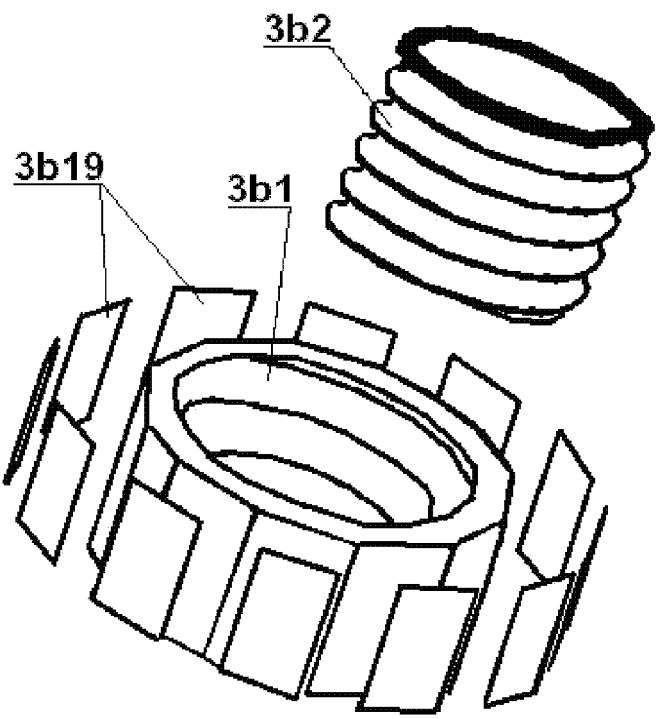
FIG. 3 schematically shows an equivalent structure of the ultrasonic motor used in the present disclosure.

The ultrasonic motor used herein may adopt the principles and structure described in a Chinese patent with a publication number of CN1873455A and a title of "an integrated optical equipment focus/zoom system". An equivalent structure of the ultrasonic motor is schematically shown in FIG. 3, which may include a stator assembly 3$b$1 and a mover assembly 3$b$2. The stator assembly may be sleeved at inside or outside of the mover assembly. The transmission between the walls of the stator assembly and the mover assembly which abut with each other may be achieved by thread fit or circumferential surface friction. At least one of the walls of the stator assembly which are not in contact with the mover assembly is a polyhedron, each surface of which is provided with a piezoelectric material 3$b$19. The piezoelectric material used herein may be, for example, piezoelectric ceramics. Each of the piezoelectric materials may be provided with driving circuit (not shown). For example, metal wires may be connected by bonding or welding to act as the driving circuit. The metal wires may transfer the electrical signals used to excite the piezoelectric materials. The piezoelectric materials may vibrate, under the excitation of the electrical signals, the stator or the mover on which they are attached to generate traveling waves, and thereby drive the mover to rotate through the fit (for example, the screw thread fit or the circumferential surface friction fit) between the stator and the mover. In FIG. 3, the stator is sleeved at outside of the mover, the inner wall of the stator is fitted with the outer wall of the mover by screw thread, and the outer wall of the stator is a polyhedron. A reverse arrangement may also be used, i.e., the mover is sleeved at outside of the stator, the inner wall of the mover is fitted with the outer wall of the stator by screw thread, and the inner wall of the stator is a polyhedron. The stator on which the piezoelectric materials are attached generally may be made of metal, such as copper or aluminum. The mover driven by the screw thread may be made of any materials, such as plastic or metal. The polyhedron ultrasonic motors described above have the advantages of high precision, low power consumption, large thrust force and having self-locking function, and thus are very suitable for zoom driving.

Figure 4:
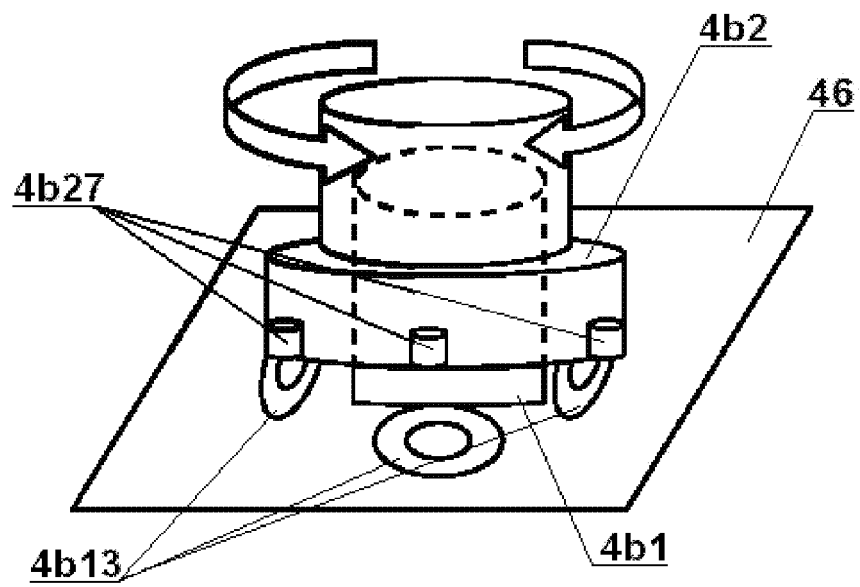
FIG. 4 schematically shows an equivalent structure of the disc motor used in the present disclosure.

The disc electromagnetic motor used herein may adopt the principles and structure described in a Chinese patent application with an application number of CN201310677074.4 and a title of "electromagnetic motor", of which an equivalent structure is schematically shown in FIG. 4. The disc electromagnetic motor may include a stator assembly 4$b$1 and a mover assembly 4$b$2. The stator assembly may be sleeved at inside or outside of the mover assembly (in FIG. 4, the mover assembly is sleeved at outside of the stator assembly and can rotate around the stator assembly; in other embodiments, the mover assembly may also be sleeved at inside of the stator assembly, and in a case that the stator assembly of the zoom driving mechanism is adjacent to the stator assembly of the focus driving mechanism, they can share a same fixed sleeve). At least one pair of mover magnetic poles 4$b$27 (in FIG. 4, four mover magnetic poles are arranged, one of which is blocked) may be mounted at the bottom of the mover assembly, and at least two stator coils 4$b$13 (in FIG. 4, four stator coils are arranged, one of which is blocked) may be arranged on the substrate 46.

The mover of the disc electromagnetic motor may be a hollow iron cylinder. In this case, the magnetic poles of the mover may be simply embedded in the wall of the iron cylinder. The mover may also be made of non-magnetic materials, such as plastic, etc., and the magnetic poles of the mover may be mounted on the surface of, or embedded in, the non-magnetic materials. The mover may also be formed by two parts: a magnetic pole ring (a ring embedded with magnetic poles and made of non-magnetic materials) at the bottom and a sleeve made of magnetic materials or magnetism reception materials at the upper portion. The magnetic poles may not protrude from the end face. A cover may further be arranged such that the magnetic poles flush with, or even are slightly concave with respect to, the end face of the cover. When alternating current or direct current is supplied to the stator windings in a certain rules, a rotating magnetic field will be generated between the stator windings and the mover magnetic poles. The magnetic field may bring the mover to rotate together through the magnetic poles. The disc electromagnetic motors described above have the advantages of large thrush force and self-locking, and thus are very suitable for zoom driving. The disc electromagnetic motors used in the present disclosure may preferably adopt step control, such that a precise displacement control may be achieve without the measurement of the movement of the mover.

Some preferred arrangements will be described hereinafter.

1. Measurement of the Zoom Movement

In order to precisely measure the position of the mover assembly of the zoom driving mechanism, a Hall magnetic ring and a Hall sensing device may be further provided. One of the Hall magnetic ring and the Hall sensing device may be fixed with respect to the zoom mover assembly, and the other may be fixed with respect to the zoom stator assembly or move only in the axial direction. The Hall sensing device may output measurement signals which may be used to represent the rotation angle of the Hall magnetic ring with respect to the Hall sensing device. Because a correspondence exists between the rotation of the mover and the axial movement of the lens support member driven thereby, the position of the lens support member can be determined by measuring the rotation of the mover. The measurement data may be sent to a host for related optical calculation and/or control of the movement of the lens group. Of course, because the disc electromagnetic motor is very suitable for implementing a precise movement by a step control, in the case that the disc electromagnetic motor controlled by the step control is used as the zooming motor, the Hall position measurement system may also be omitted. Preferably, when a transmission magnetic ring is used as the transmission mechanism of the zoom driving mechanism (described in details below), the Hall magnetic ring may be integrated with the transmission magnetic ring.

2. Transmission of the Zoom Driving Mechanism

The mover assembly of the zoom driving mechanism used in the present disclosure may adopt a variety of suitable transmission structures to drive the zoom lens group to move axially. Generally, the lens group may be fixedly mounted in a corresponding lens support member, such as a lens barrel. The mover may drive the lens group to move by driving the lens support member. The lens support member may be fixed radially. For example, a limiting slide bar or sliding slot which may limit the lens support member to move only in the axial direction may be arranged, such that the lens group can only move in the axial direction. The limiting slide bar may pass through the side wall of the lens support member such that the lens support member can slide axially along the slider bar. Or, the side wall of the lens support member may also be provided with grooves or protrusions extending in the axial direction which may be cooperated with corresponding fixation member in order to restrict the lens support member to move only in the axial direction. Of course, in the case that the mover has spiral or linear trajectory, the zoom lens group may also be fixed directly on the mover assembly.

The mover may be kept in contact with the lens support member driven thereby by applying a pre-pressure. The pre-pressure may be provided by a variety of suitable ways. In an embodiment, an elastic force of a spring may be used. For example, the spring may be used to apply a pressure at an end of the lens support member which does not contact with the mover. In another embodiment, a magnetic force may be used. For example, a magnetic ring may be bonded at an end of the mover which contacts with the lens support member, and the lens support member is at least partially made of magnetic or magnetism reception materials, such that the mover is kept in contact with the lens support member driven thereby by the magnetic attraction force.

Several transmission structures by which the mover drives the lens support member are described below by way of example.

(1) Transmission Structure with a Fit Between a Support Pin and a Bump Edge

In this transmission structure, the trajectory of the mover (for example, the mover of the disc electromagnetic motor or the ultrasonic motor) may be spiral or circular. One of the mover and the lens support member driven thereby may be provided with a support pin extending axially at an end face, and the other may be provided with a bump edge at an end face. A free end of the support pin may be kept in contact with the bump edge such that the spiral or circular motion of the mover may drive the lens support member to move axially. With this transmission structure, the shape of the bump edge of the lens support member may be designed to satisfy the requirement of the motion curve of the lens assembly and limit the rotation range of the support pin. For example, projections may be arranged at two endpoints of the rotation range to stop the movement of the support pin.

Figure 5:
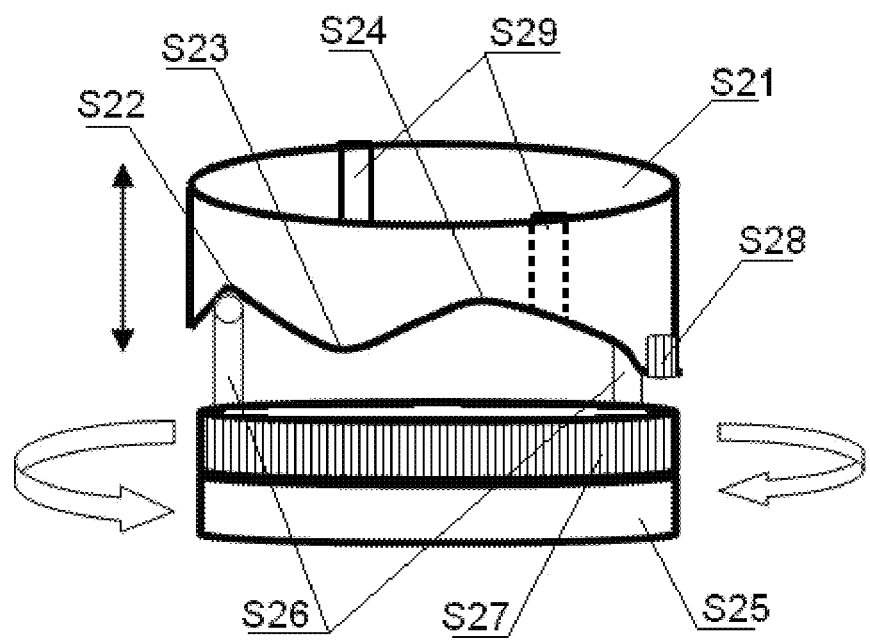
FIG. 5 schematically shows a transmission structure of a zoom mover assembly used in the present disclosure.

An example is shown in FIG. 5. An end face of a lens barrel S21 acting as the lens support member may be provided, according to the optical design, with a bump edge which includes two curved sections, where S22 is the endpoint of the retraction of the lens barrel, S23 is the starting point of the zooming, and S24 is the endpoint of the zooming. The curve shown in the figure is merely schematic, and specifically may be determined according to the optical design. An inner wall of the lens barrel may be further provided with limiting slide bars S29 which restrict the lens barrel to move axially only, and thereby the rotation motion of the mover may be converted into the axial linear motion of the lens barrel. Two support pins S26 which are symmetrical with each other may be fixed at the mover S25. Correspondingly, the bump edge of the lens barrel with which the support pins are in contact may also be symmetrical with each other, which can increase the stability of the whole structure. In addition, in order to measure the movement of the lens barrel, a Hall magnetic ring S27 may be bonded to the surface of the mover. A Hall sensing device S28 may be correspondingly fixed on the lens barrel. The Hall magnetic ring may be also used to provide the magnetic link between the lens barrel (made of steel) and the mover. In order to facilitate the processing, the lens barrel may be made in two parts. The two parts then may be spliced together to form the complete lens barrel. For example, the part with the bump edge may be made of plastic materials and the part with cylindrical shape may be made of magnetic or magnetism reception materials.

(2) Transmission Structure with a Fit Between a Transmission Rod and a Curved Sliding Slot In this transmission structure, the trajectory of the mover may be spiral or circular. One of the mover and the lens support member driven thereby may be provided with a transmission rod extending outwardly, and the other may be provided with a curved sliding slot at a side wall. A free end of the transmission rod may be inserted into the curved sliding slot such that the spiral or circular motion of the mover may drive the lens support member to move axially.

Figure 6:
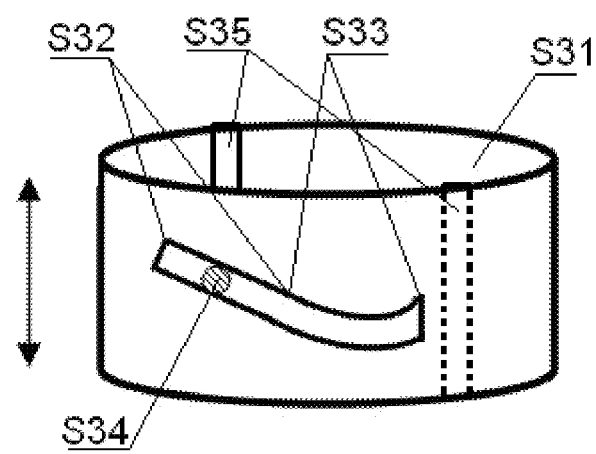
FIG. 6 schematically shows a transmission structure of another zoom mover assembly used in the present disclosure.

An example is shown in FIG. 6. An outer wall (or inner wall) of a lens barrel S31 acting as the lens support member may be provided, according to the optical design, with a curved sliding slot, where S32 is a telescoping section and S33 is a zooming section. The curve shown in the figure is merely schematic. The upturned portion at the end of S33 may indicate that the optical design of the lens has an inflection point. The specific shape of the curve may be determined according to the optical design. The inner wall of the lens barrel may be further provided with limiting slide bars S35 which may restrict the lens barrel to move axially only. The free end of the transmission rod S34 fixed on the mover (not shown) may be inserted into the sliding slot. With this transmission structure, because the starting point and the endpoint of the sliding slot can be conveniently set to limit the rotation range of the transmission rod, additional limiting mechanisms of the mover or the lens barrel can be unnecessary. In other embodiments, two transmission rods and corresponding sliding slots may be symmetrically arranged to obtain a more stable structure.

Two preferred transmission structures by which the mover of the zoom driving mechanism drives the lens support member are shown in FIG. 5 and FIG. 6, where the bump edge or the curved sliding slot may include two sections which respectively correspond to the telescoping motion and the zooming motion of the zoom lens group. Therefore, the telescoping process and the zooming process of the lens can be implemented integrally.

(3) Direct Contact Transmission Structure

In this transmission structure, the trajectory of the mover may be spiral or linear. For example, the mover of the disc electromagnetic motor or the ultrasonic motor can generate a spiral trajectory by a thread fit with the stator. The mover of the voice coil motor may have a linear trajectory, and an end face of the mover may be kept in contact with an end of the lens support member driven by the mover to directly drive the lens support member to move axially.

The zoom driving mechanism may be further provided with a limiting mechanism, which may be arranged, for example, on the zoom stator assembly or the substrate and used to limit the range of motion of the zoom mover assembly, such as the range of the rotation motion.

It should be noted that in a case that the mover of the zooming motor needs to simultaneously drive two or more zoom lens groups (for example, the zoom lens groups supported by two or more zoom lens barrels (lens support members) closely sleeved with each other), the mover may utilize the same transmission structure or jointly utilize different transmission structures. For example, the mover may drive one lens barrel by the direct contact transmission structure, and simultaneously drive another lens barrel which is sleeved at outside of the one lens barrel by the transmission rod. Or, support pins (or bump edges) may be arranged at the mover in different radial direction in order to drive the lens barrels which have calibers corresponding to the position of the support pins, respectively. Or, the mover may drive one lens barrel by the support pin, and simultaneously drive another lens barrel which is sleeved at outside of the one lens barrel by the transmission rod. Or, the mover may simultaneously drive two lens barrels which are sleeved with each other by different transmission rods.

3. Methods for Forming the Coil and the Circuit

In a preferred embodiment, the coil, or a part thereof, of the focus driving mechanism and/or the zoom driving mechanism used in the present disclosure may be made of printed circuit, such as the driving coil of the voice coil motor, the stator coil of the disc motor and the driving circuit of the ultrasonic motor, etc. Of course, it may also be possible to form the coil by traditional winding using insulated covered wires. Replacing the winding with printed circuit can avoid the difficulty in winding operation (particularly, the size of the voice coil motor used for optical focusing is generally small), and the installation can be easier. The printed circuit may be formed at a hard board, such as a printed circuit board (PCB), or at a soft board, such as a flexible printed circuit board (FPC). Each of the PCBs or FPCs may be provided with a single-layer circuit, or may also be formed by two or more layers of circuit, such as two, four, six, eight, ten, twelve layers of circuit, etc. With the coil made of printed circuit, on one hand, the difficult and precise winding operation for a micro-motor can be completely omitted; on the other hand, the PCB or FPC printed with the winding may also act as the substrate of the zoom lens. A photosensitive chip, a control circuit and the like can be arranged on the substrate, and thereby a more compact lens assembly can be achieved.

Figure 7:
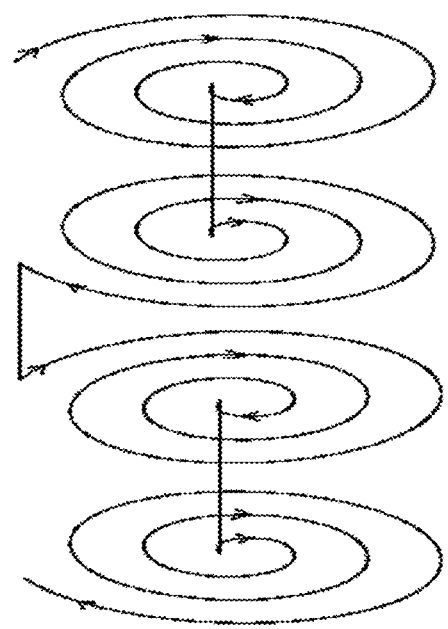
FIG. 7 schematically shows the winding mode of a four-layer printed circuit used in the present disclosure.
Figure 8:
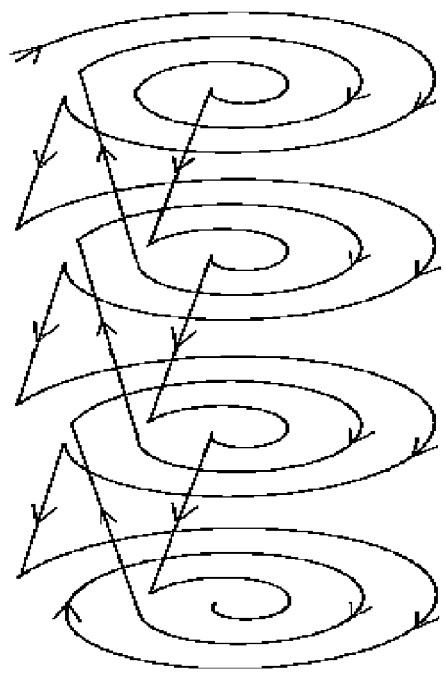
FIG. 8 schematically shows the winding mode of another four-layer printed circuit used in the present disclosure.

Based on mature technologies for manufacturing a printed circuit, the structure of the printed circuit may be arranged according to a predetermined coil configuration, and the winding required may be obtained by one single unit (one PCB or FPC) or by splicing a plurality of PCBs or FPCs (the wires which are located at the ends and need to be connected may be welded). Referring to FIG. 7 and FIG. 8, two typical arrangements of printed circuit are shown, in which the arrows indicate the directions of the currents. A person skilled in the art will readily understand that the arrangement and/or the splicing mode of the printed circuit can be correspondingly designed according to the configuration required by the winding. In FIG. 7, a planar spiral winding overlapped in axial direction is shown, where the wire is spirally wound in a single layer first, and then enters into another layer through a perforation and continues to be spirally wound. Each layer of spiral circuit may be one single-layer PCB or FPC, or be one layer of a multi-layer PCB or FPC. The layers may be connected by conductive vias (the same below). In FIG. 8, a layered 3D spiral winding nested in radial direction is shown, where the wire is spirally wound between different layers first, and then is three-dimensionally spirally wound from inside to outside (or from outside to inside), which can be regarded as a nesting of several vertical coils with different diameters. The printed circuits may preferably be made of superconducting materials, and thereby the copper loss and heating of the motor can be significantly reduced, and the performance and reliability of the motor can be increased.

As described above, a variety of modifications to the specific structure of the zoom lens according to the present disclosure may be made. For example, the relative positions of the focus stator sleeve and the focus mover sleeve may be interchangeable. As another example, the magnetization direction of the permanent magnet sleeve may be radial or axial. As another example, the preliminary magnetic member may be arranged on the focus stator assembly or on the focus mover assembly. These different modifications may be combined with each other to obtain various different embodiments. The zoom lens according to the present disclosure will be illustrated with reference to specific embodiments hereinafter.

Embodiment 1

Figure 9:
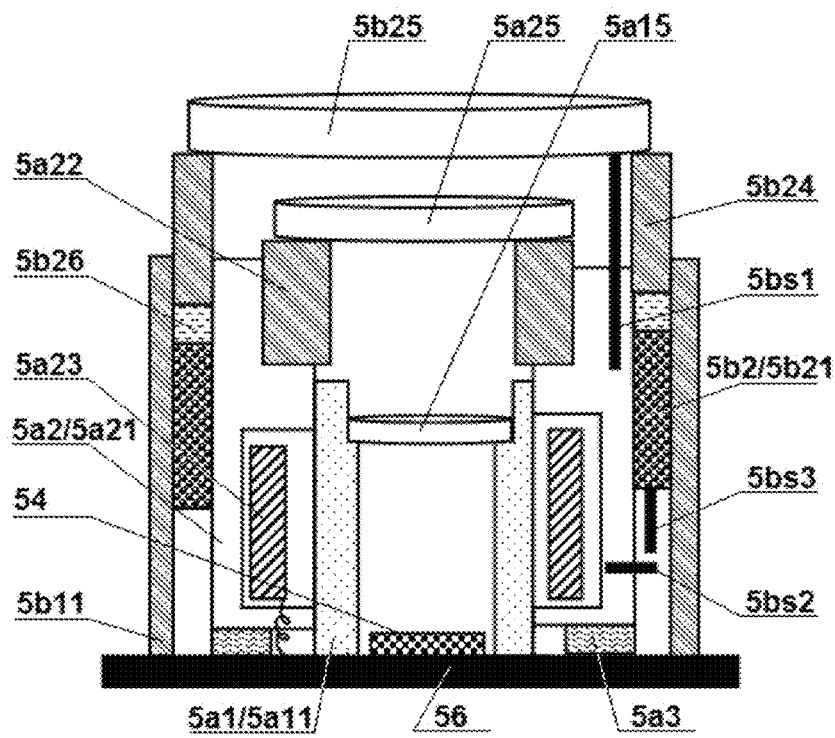
FIG. 9 schematically shows the zoom lens of embodiment 1.

An embodiment of the zoom lens according to the present disclosure is shown in FIG. 9. The zoom lens may include a substrate 56, a focus driving mechanism, a first focus lens group 5*a*25, a zoom driving mechanism and a first zoom lens group 5*b*25. Based on the optical design, the zoom lens of the present disclosure may further include a stationary second focus lens group 5*a*15 which may be installed between the first focus lens group and the substrate and fixed with respect to the substrate. For example, the second focus lens group may be fixed on a focus stator sleeve 5*a*11. In other embodiments, the second focus lens group may also be fixed on a fixed sleeve which is arranged additionally. In the present embodiment, in order to obtain a more compact structure and simplify the electrical connection, the substrate may preferably be PCB, on which a photosensitive chip 54 may be further mounted.

The focus driving mechanism may be a voice coil motor, and may include a focus stator assembly 5*a*1, a focus mover assembly 5*a*2 and an elastic connection member 5*a*3. The focus stator assembly may include a focus stator sleeve 5*a*11 which may be a permanent magnet sleeve and fixed on the substrate. The focus mover assembly may include a focus mover sleeve 5*a*21, a preliminary magnetic ring 5*a*22 and a driving coil 5*a*23. The focus mover sleeve may be a non-magnet sleeve. The focus mover sleeve may be a cylindrical sleeve with smooth inner and outer surfaces, and may be closely sleeved at inside of the focus stator sleeve coaxially. A recess may be arranged at the middle of the focus mover sleeve, which may be used to receive the driving coil. The electrical connector of the driving coil may pass through a through hole arranged at the bottom of the recess to connect the PCB substrate acting as the lens base. The elastic connection member may be connected between the focus mover sleeve and the substrate. The preliminary magnetic ring may be fixed at one end of the focus mover sleeve away from the substrate. In the present disclosure, the preliminary magnetic ring may be simultaneously used as the lens support member of the first focus lens group. In other embodiments, a non-magnetic lens support member and a preliminary magnetic ring may be arranged separately.

The preliminary magnetic ring and the permanent magnet sleeve (in the present embodiment, the focus stator sleeve) may attract each other. Thereby, the pre-magnetic force (pressure) may be applied on the elastic connection member and be kept balance with the elastic force of the elastic connection member before the driving coil is supplied with power. When the voice coil motor works in the vicinity of the balance point, a large driving travel can be achieved using a small driving current.

Preferably, in order to, during the installation, facilitate the adjustment of the lens focal length at the force balance position of the elastic connection member when the driving coil is not supplied with power, the fit between the lens support member (in the present embodiment, the preliminary magnetic ring) and the focus mover sleeve may be a thread fit, such that the focal length can be adjusted during the installation of the first focus lens group.

In the present embodiment, the zoom driving mechanism may be a polyhedral ultrasonic motor. Its stator assembly may include a zoom stator sleeve 5$b$11, and the mover assembly 5$b$2 may include a zoom mover sleeve 5$b$21, a lens support member 5$b$24 of a first zoom lens group, and a transmission magnetic ring 5$b$26 which cause the zoom mover sleeve to be kept in contact with the lens support member driven thereby. The inner surface of the zoom stator sleeve may be provided with screw thread. The outer surface of the zoom stator sleeve may be a polyhedron. Each surface of the polyhedron may be provided with piezoelectric material (not shown), such as piezoelectric ceramic sheet. The zoom mover sleeve may be made of ferromagnetic materials (such as steel). The inner surface of the zoom mover sleeve may be a smooth cylindrical surface, and the outer surface may be a threaded surface which may be fitted with the stator sleeve. Therefore, the zoom mover sleeve may have a spiral motion trajectory. The transmission magnetic ring may be fixed at one end of the lens support member (the lens barrel); such that the lens barrel and the mover sleeve can be slid with respect to each other while a close axial connection (magnetic force connection) is maintained therebetween. A limiting slide bar 5$bs$1 may be arranged on the inner or outer surface of the lens barrel 5$b$24, such that the first zoom lens group can only perform axial linear motion. In addition, a limiting mechanism which limits the range of motion of the zoom mover sleeve may be further provided, such as an axial limiting mechanism 5$bs$2 and a rotation limiting mechanism 5$bs$3.

In the present embodiment, the ultrasonic motor may adopt the threaded coupling driving mode. In other embodiments, other driving modes may also be used, such as circumferential surface friction coupling driving mode, etc.

Embodiment 2

Figure 10:
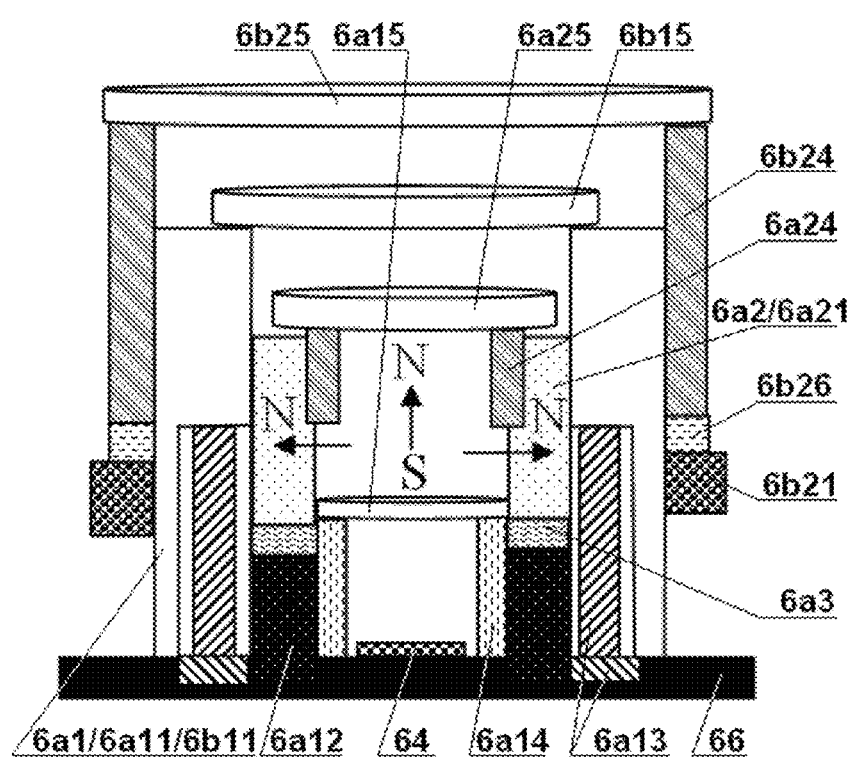
FIG. 10 schematically shows the zoom lens of embodiment 2.

Another embodiment of the zoom lens according to the present disclosure is shown in FIG. 10. The zoom lens may include a PCB substrate 66, a focus driving mechanism, a first focus lens group 6$a$25, a zoom driving mechanism and a first zoom lens group 6$b$25. A photosensitive chip 64 may be mounted on the PCB substrate. Based on the optical design, the zoom lens of the present embodiment may further include a stationary second focus lens group 6$a$15 and a stationary second zoom lens group 6$b$15 so as to achieve better focusing performance. The second focus lens group may be installed between the first focus lens group and the substrate. The lens support member of the second focus lens group may be a sleeve 6$a$14 fixed on the substrate. The sleeve may be used to limit the focus mover sleeve at the same time. The second zoom lens group may be installed between the first zoom lens group and the first focus lens group and fixed with respect to the substrate. For example, the second zoom lens group may be fixed on the focus stator sleeve 6$a$11 (the zoom stator sleeve 6$b$11). In the present embodiment, the focus stator sleeve and the zoom stator sleeve may be a same piece and the focus mover sleeve 6$a$21 and the zoom mover sleeve 6$b$21 may be located at the inner surface and the outer surface of the stator sleeve, respectively. Therefore, the structure is very compact.

The focus driving mechanism may be a voice coil motor. The focus mover sleeve of the focus mover assembly 6$a$2 may be a cylindrical permanent magnet sleeve with smooth inner and outer surface. Therefore, the focus stator assembly 6$a$1 may include a preliminary magnetic ring 6$a$12 and a driving coil 6$a$13. The first focus lens group may be installed on the focus mover sleeve through the lens support member 6$a$24 (which may be made of non-magnetic materials) by threaded fit. The preliminary magnetic ring may be fixed on the substrate (the lens base). A portion of the preliminary magnetic ring may be embedded in the substrate. The elastic connection member 6$a$3 (such as spring leaf) may be connected between the focus mover sleeve and the preliminary magnetic ring.

The zoom driving mechanism may be a polyhedral ultrasonic motor. Screw thread may be arranged on the outer surface of the zoom stator sleeve (which may be integrated with the focus stator sleeve and made of non-magnetic materials). The upper portion of the inner surface of the zoom stator sleeve may be a smooth sleeve which may be closely sleeved with the focus mover sleeve, and the lower portion may be provided with a recess. The surface of the recess may be a polyhedron. Each surface of the polyhedron may be attached with a piezoelectric ceramic sheet. The zoom stator sleeve may be made of materials which match the coefficient of rigidity of the piezoelectric ceramic, such as aluminum, copper, etc. The driving coil, or a part thereof, of the focus driving mechanism may be received in the polyhedral cavity, and another part may be arranged on the PCB substrate. The circuit (not shown) driving the ultrasonic motor and the driving coil 6$a$13 may be FPC coil and be integrated as one piece. The zoom mover sleeve 6$b$21 may be a steel ring. The transmission magnetic ring 6$b$26 may be fixed at one end of the lens barrel 6$b$24 of the first zoom lens group, such that the lens barrel and the mover sleeve can be slid with respect to each other while a close axial connection (magnetic force connection) can be maintained therebetween, similar to embodiment 1. The lens barrel may be provided a limiting mechanism (not shown) which can only move in the axial direction. In order to measure the zoom motion, the transmission magnetic ring may be a Hall magnetic ring. In this case, a Hall measurement device (not shown) may be fixed on the zoom mover sleeve. On the contrary, in the case that the lens barrel 6$b$24 is made of ferromagnetic materials, the transmission magnetic ring may also be fixed on the mover sleeve. In this case, the Hall measurement device may be fixed on the lens barrel. In the present embodiment, the piezoelectric ceramic sheet may also be disposed on the outer surface of the zoom mover sleeve.

The main differences between the present embodiment and the embodiment 1 are that four lens groups are used, the positions of the mover and the stator of the ultrasonic motor are interchanged, and the focus mover sleeve is a permanent magnet sleeve, and thereby the arrangement of the preliminary magnetic ring and the driving coil are changed.

In FIG. 10, N and S represent optional magnetic pole directions of the focus mover sleeve, respectively. As shown in the figure, the magnetization direction of the focus stator sleeve may be the radial direction (where the inner surface and the outer surface of the focus mover sleeve are the south pole or the north pole, respectively), or may also be the axial direction (where the upper end and the lower end of the focus mover sleeve are the south pole or the north pole, respectively).

Embodiment 3

Figure 11:
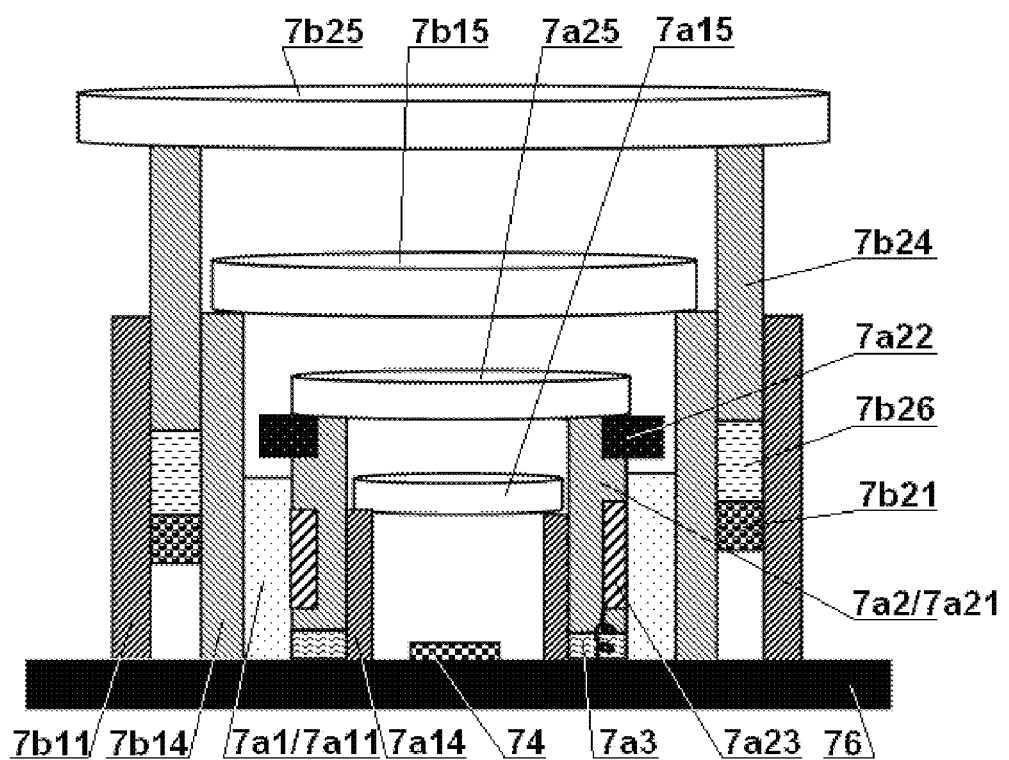
FIG. 11 schematically shows the zoom lens of embodiment 3.

Another embodiment of the zoom lens according to the present disclosure is shown in FIG. 11. The zoom lens may include a PCB substrate 76, a focus driving mechanism, a first focus lens group 7a25, a zoom driving mechanism and a first zoom lens group 7b25. A photosensitive chip 74 may be mounted on the PCB substrate. Based on the optical design, the zoom lens of the present embodiment may further include a stationary second focus lens group 7a15 and a stationary second zoom lens group 7b15 so as to achieve better focusing performance. The second focus lens group may be installed between the first focus lens group and the substrate. The lens support member of the second focus lens group may be a sleeve 7a14 fixed on the substrate. The sleeve may be used to limit the focus mover sleeve at the same time. The second zoom lens group may be installed between the first zoom lens group and the first focus lens group. The lens support member of the second zoom lens group may be a sleeve 7b14 fixed on the substrate.

The focus driving mechanism may be a voice coil motor. The focus stator sleeve 7a11 of the focus stator assembly 7a1 may be a permanent magnet sleeve and fixed on the substrate. The focus mover sleeve 7a21 may be a non-magnet sleeve of which the top is provided with external screw thread, and be closely sleeved in the focus stator sleeve. Therefore, the focus mover assembly 7a2 may include a preliminary magnetic ring 7a22 and a driving coil 7a23. In the present embodiment, the preliminary magnetic ring may simultaneously act as the lens support member of the first focus lens group, and be provided with internal screw thread which may engage with the external screw thread at the top of the focus mover sleeve. The outside of the focus mover sleeve may be provided with a recess which may be used to receive the driving coil. The electrical connector of the driving coil may pass through the through hole arranged at the bottom of the recess to connect the elastic connection member 7a3 by which then the electrical connector may be connected to the PCB substrate acting as the lens base. Or, the electrical connector of the driving coil may also be connected to the PCB substrate directly. The elastic connection member 7a3 may be connected between the focus mover sleeve and the substrate.

The zoom driving mechanism may be a polyhedral ultrasonic motor. The sleeve 7b14 supporting the stationary second zoom lens group may be sleeved at outside of the focus stator sleeve. The zoom mover sleeve 7b21 may be closely sleeved at outside of the fixed sleeve. The inner surface of the zoom mover sleeve may be a smooth cylindrical surface, and the outer surface may be a threaded surface which may be closely fitted with the inner surface of the zoom stator sleeve 7b11 by screw thread. The outer surface of the zoom stator sleeve may be a polyhedron of which each surface may be attached with a piezoelectric ceramic sheet. Similar to embodiment 2, the zoom mover sleeve may drive the first zoom lens group to move axially through the transmission magnetic ring 7b26 bonded at one end of the lens barrel 7b24 of the first zoom lens group. The transmission magnetic ring may be a Hall magnetic ring.

In the present embodiment, a stationary lens sleeve is further provided, which increases the radial dimension, and thereby can reduce the complexity of the processing of the lens.

Embodiment 4

Figure 12:
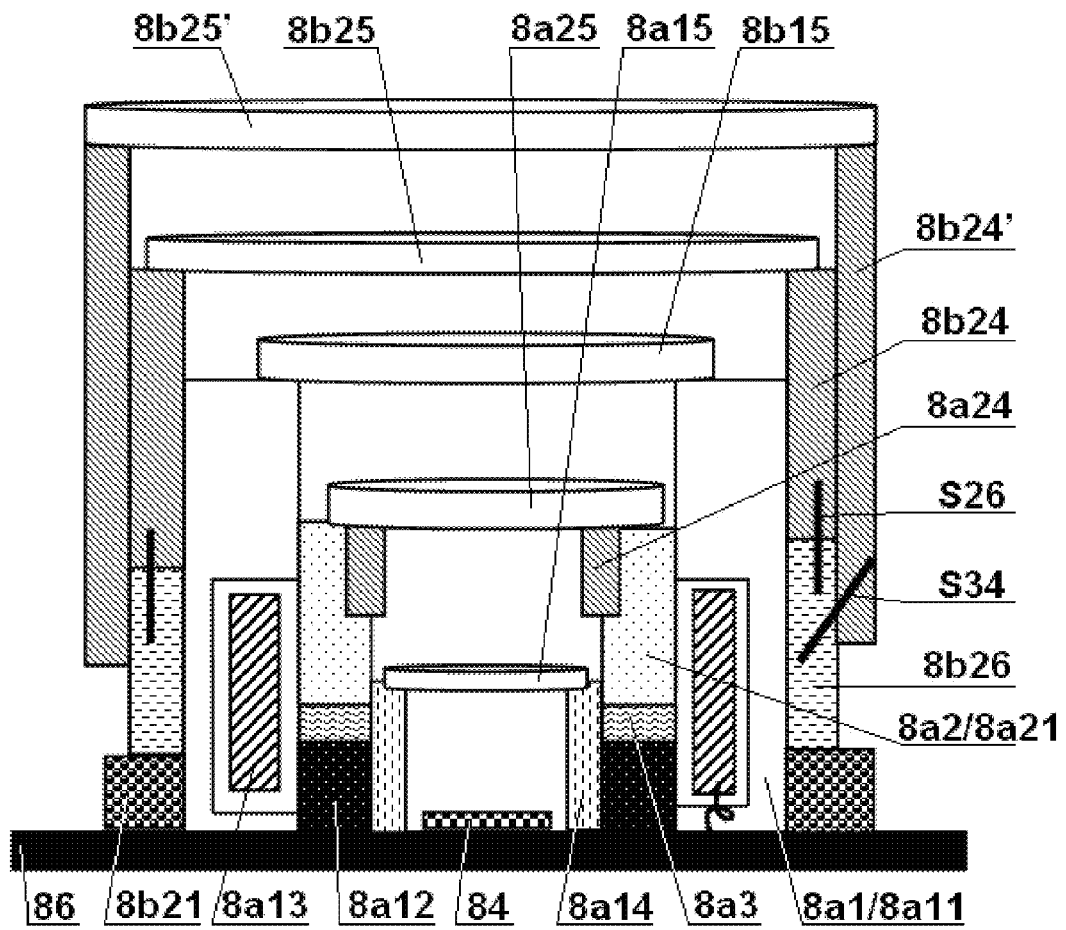
FIG. 12 schematically shows the zoom lens of embodiment 4.

Another embodiment of the zoom lens according to the present disclosure is shown in FIG. 12. The zoom lens may include a PCB substrate 86, a focus driving mechanism, a first focus lens group 8a25, a zoom driving mechanism and a first zoom lens group 8b25. A photosensitive chip 84 may be mounted on the PCB substrate. Based on the optical design, three additional lens groups may be used in the present embodiment, which may include a stationary second focus lens group 8a15, a stationary second zoom lens group 8b15 and a third zoom lens group 8b25' driven by the zoom driving mechanism. The use of five lens groups enables the present embodiment to implement a high performance zoom lens. The second focus lens group may be installed between the first focus lens group and the substrate. The lens support member of the second focus lens group may be a sleeve 8a14 fixed on the substrate. The sleeve may be used to limit the focus mover sleeve at the same time. The second zoom lens group may be installed between the first zoom lens group and the first focus lens group and fixed with respect to the substrate. For example, the second zoom lens group may be fixed on the focus stator sleeve 8a11.

The focus driving mechanism may be a voice coil motor. The focus stator sleeve may be made of non-magnetic materials (such as plastics). The focus mover sleeve 8a21 of the focus mover assembly 8a2 may be a permanent magnet sleeve of which the top is provided with internal screw thread. Therefore, the focus stator assembly 8a1 may include a preliminary magnetic ring 8a12 and a driving coil 8a13. The focus stator sleeve may be fixed on the substrate and closely sleeved at outside of the focus mover sleeve. The lower portion of the inside of the focus stator sleeve may be provided with a recess which may be used to receive the driving coil. The electrical connector of the driving coil may pass through the through hole arranged at the bottom of the recess to connect the substrate. The first focus lens group may be installed on the focus mover sleeve through the lens support member 8a24 (which may be made of non-magnetic materials) provided with external screw thread by thread fit. The preliminary magnetic ring may be fixed on the substrate (the lens base). An elastic connection member 8a3 (for example, a spring leaf) may be connected between the focus mover sleeve and the preliminary magnetic ring.

The zoom driving mechanism may be a disc electromagnetic motor. The stator coil (not shown) of the disc electromagnetic motor may be arranged on the PCB substrate, for example, may be implemented by printed circuit. The zoom mover sleeve 8b21 may be closely sleeved at outside of the focus stator sleeve 8a11. Therefore, the zoom stator sleeve and the focus stator sleeve may be considered as one same piece. The zoom mover sleeve may be made of magnetic materials and only perform in-situ rotation movement (no axial movement). The transmission magnetic ring 8b26 may be fixed on the zoom mover sleeve. The transmission magnetic ring may drive the first zoom lens group to move axially by the cooperation of the support pin S26 arranged on the end face thereof with the bump edge on the end face of the lens barrel 8b24 of the first zoom lens group. The bump edge may include two sections. The first section may be a telescoping section, and the second section may be a zooming section. The lens barrel 8b24 may be provided with a limiting mechanism which can only perform axial motion. In addition, the transmission magnetic ring may further drive the lens barrel 8b24' (which may be closely sleeved at outside of the lens barrel of the first zoom lens group) of the third zoom lens group through the transmission rod S34. The zoom mover sleeve may also adopt the Hall magnetic ring, and the corresponding Hall measurement device (not shown) may be fixed on the substrate.

In the examples above, all of the lens groups and sleeves (lens barrels) may be concentric and coaxial. The installation order of the lens may be from inside to outside. Therefore, the workability is good. The preferred embodiments above can substantially satisfy the requirements in structure for most of the lens whose zoom factor is not very large. In the case that it is necessary to implement a miniaturized multi-stage telescopic zoom lens with large zoom factor, based on the examples above, lens barrels and transmission structures (transmission rods) may be further provided around the lens, or a motor may be added.

The principles and embodiments of the present disclosure have been described in the above with reference to specific examples. However, it should be understood that the embodiments described above are merely used to facilitate the understanding to the present disclosure, but should not be interpreted as limitations thereto. A variety of modifications to the specific embodiments described above can be made by a person ordinarily skilled in the art according the concepts of the present disclosure.

I claim:

1. A zoom lens, comprising a substrate, a focus driving mechanism, a first focus lens group, a zoom driving mechanism and a first zoom lens group;
   wherein the focus driving mechanism drives the first focus lens group to move axially, and the zoom driving mechanism drives the first zoom lens group to move axially;
   and wherein:
   the focus driving mechanism and the zoom driving mechanism are sleeves arranged coaxially, and the zoom driving mechanism is sleeved at outside of the focus driving mechanism;
   the focus driving mechanism is a voice coil motor and comprises a focus stator assembly, a focus mover and an elastic connection member, wherein the focus stator assembly is fixed with respect to the substrate, and the focus mover assembly is connected with the focus stator assembly through the elastic connection member;
   the focus stator assembly comprises a focus stator sleeve;
   the focus mover assembly comprises a focus mover sleeve which is sleeved with the focus stator sleeve;
   one of the focus stator sleeve and the focus mover sleeve is a permanent magnet sleeve, and the other is a non-magnet sleeve; and
   the assembly to which the non-magnet sleeve belongs further comprises:
   a preliminary magnetic member which is made of permanent magnetic or magnetism reception materials and fixed with respect to the non-magnet sleeve; and
   a driving coil which is fixed with respect to the non-magnet sleeve;
   wherein when the driving coil is not supplied with power, a magnetic force previously existing between the preliminary magnetic member and the permanent magnet sleeve is balanced with an elastic force of the elastic connection member.

2. The zoom lens of claim 1, wherein
   a magnetization direction of the permanent magnet sleeve is a radial direction or an axial direction.

3. The zoom lens of claim 1, wherein
   the focus stator sleeve is closely sleeved with the focus mover sleeve and a contact surface therebetween is a smooth surface.

4. The zoom lens of claim 1,
   further comprising a second focus lens group which is installed between the first focus lens group and the substrate and fixed with respect to the substrate; and/or
   further comprising a second zoom lens group which is installed between the first zoom lens group and the first focus lens group and fixed with respect to the substrate, wherein, preferably, a lens support member of the lens group fixed with respect to the substrate is provided with screw thread which is used to adjust a focal length during installation.

5. The zoom lens of claim 1, wherein
   a lens support member of the first zoom lens group is provided with a limiting slide bar or sliding slot which limits the lens support member to move only axially;
   the zoom driving mechanism comprises a zoom stator assembly and a zoom mover assembly, and the zoom stator assembly is fixed with respect to the substrate; and
   a trajectory of the zoom mover assembly is spiral or circular; one of the zoom mover assembly and the lens support member driven thereby is provided with a support pin extending axially at an end face, and the other is provided with a bump edge at an end face; and a free end of the support pin is kept in contact with the bump edge such that a spiral or circular motion of the zoom mover assembly drive the lens support member to move axially; or
   a trajectory of the zoom mover assembly is spiral or circular; one of the zoom mover assembly and the lens support member driven thereby is provided with a transmission rod extending outwardly, and the other is provided with a curved sliding slot at a side wall; and a free end of the transmission rod is inserted into the curved sliding slot such that a spiral or circular motion of the zoom mover assembly drive the lens support member to move axially; or
   a trajectory of the zoom mover assembly is spiral or linear, and an end face of the zoom mover assembly is kept in contact with an end of the lens support member driven by the zoom mover assembly to directly drive the lens support member to move axially.

6. The zoom lens of claim 5, wherein the zoom driving mechanism adopt the support pin transmission structure or the transmission rod transmission structure, and a shape of the bump edge or the curved sliding slot comprises tow curves which correspond to telescoping motion and zooming motion of the first zoom lens group, respectively.

7. The zoom lens of claim 5, further comprising a third zoom lens group, wherein a lens support member of the third zoom lens group is provided with a limiting slide bar or sliding slot which limit the lens support member to move only axially, and is closely sleeved at outside of the lens support member of the first zoom lens group, and the zoom driving mechanism further use the support transmission structure or the transmission rod transmission structure to drive the third zoom lens group to move axially.

8. The zoom lens of claim 5, wherein the zoom driving mechanism further comprises a Hall magnetic ring and a Hall sensing device; one of the Hall magnetic ring and the Hall sensing device is fixed with respect to the zoom mover assembly, and the other is fixed with respect to the zoom stator assembly or move only in axial direction; the Hall sensing device outputs measurement signal which is used to represent a rotation angle of the Hall magnetic ring with respect to the Hall sensing device; and, preferably, the Hall magnetic ring is integrated with a transmission magnetic ring, wherein the transmission magnetic ring is fixed at an end face of the zoom mover assembly or an end of the lens support member driven thereby and used to provide magnetic force for keeping the zoom mover assembly in contact with the lens support member driven thereby.

9. The zoom lens of claim 1, wherein
the zoom driving mechanism adopts polyhedral ultrasonic motor driving mode, in which a stator assembly is sleeved at inside or outside of a mover assembly, a transmission between walls of the stator assembly and the mover assembly which abut with each other is achieved by thread fit or circumferential surface friction, at least one of walls of the stator assembly which are not in contact with the mover assembly is a polyhedron, each surface of the polyhedron is provided with a piezoelectric material, each piezoelectric material is connected with a driving circuit, and, preferably, the piezoelectric material is piezoelectric ceramic.

10. The zoom lens of claim 1, wherein
the zoom driving mechanism adopts disc electromagnetic motor driving mode, in which a stator assembly is sleeved at inside or outside of a mover assembly, at least one pair of mover magnetic poles are mounted at bottom of the mover assembly, and at least two stator coils are arranged on the substrate.

11. The zoom lens of claim 10, wherein a coil, or a part of the coil, of the focus driving mechanism and/or the zoom driving mechanism is made of printed circuit, the printed circuit is formed on a printed circuit board or a flexible printed circuit board, the printed circuit board or the flexible printed circuit board are formed by one or two or more layers of circuit, the printed circuit on the printed circuit board or the flexible printed circuit board adopt a planar spiral winding overlapped in axial direction and/or a layered 3D spiral winding nested in radial direction, and, preferably, the printed circuit is made of superconducting materials.

* * * * *